March 21, 1939.  R. H. ANDERSON  2,151,066
ARTICLE FOR STRUCTURAL AND OTHER PURPOSES
Filed July 1, 1936  2 Sheets-Sheet 1
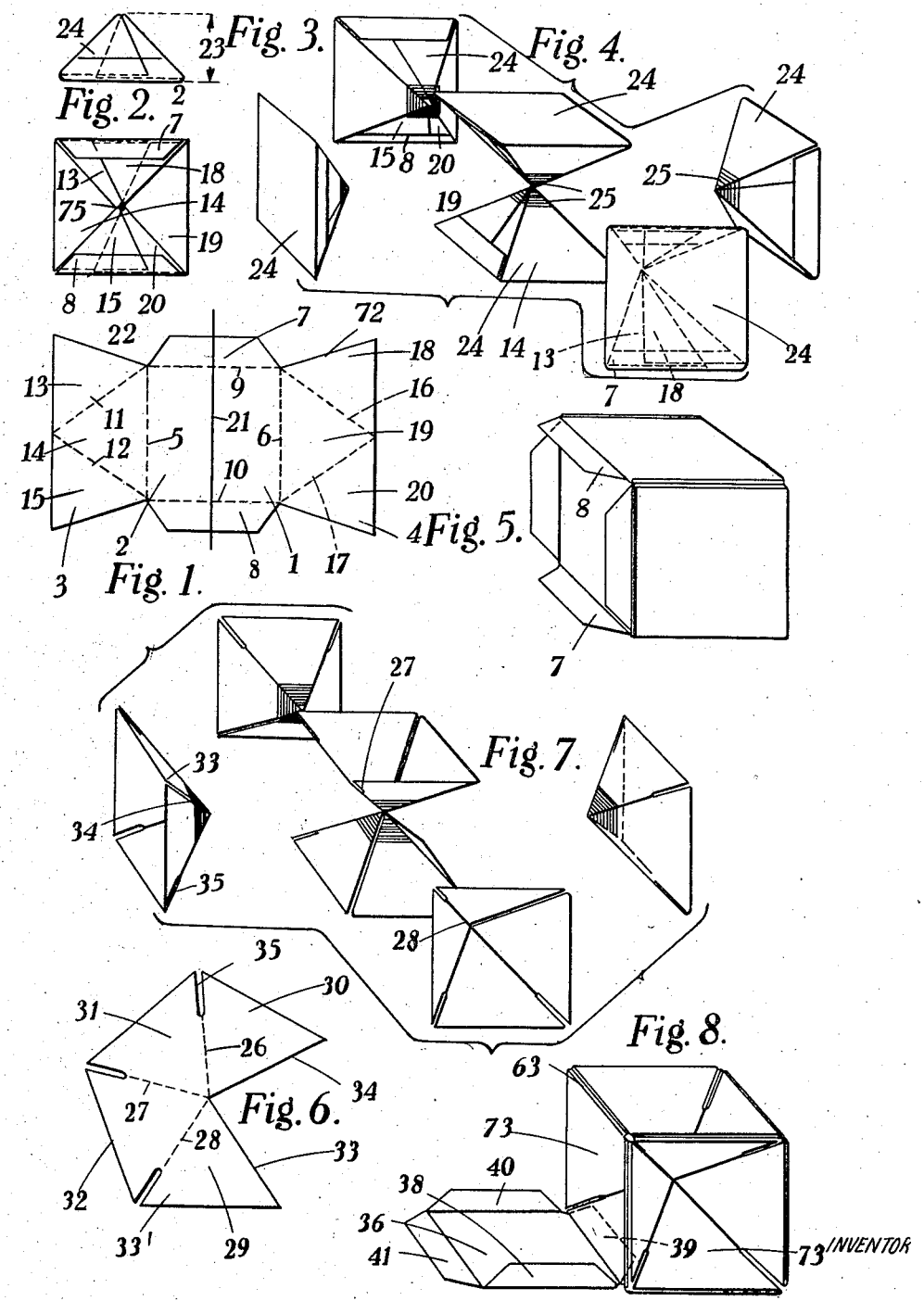
Robert H. Anderson,
INVENTOR
ATTORNEYS March 21, 1939.  R. H. ANDERSON  2,151,066
ARTICLE FOR STRUCTURAL AND OTHER PURPOSES
Filed July 1, 1936  2 Sheets-Sheet 2
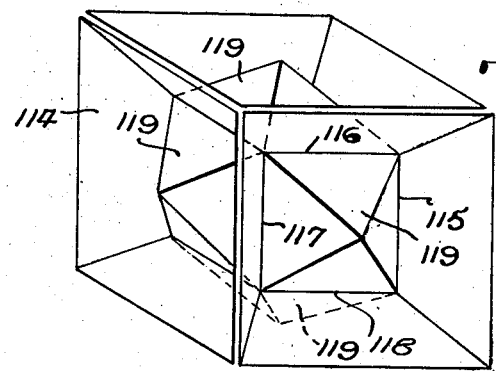
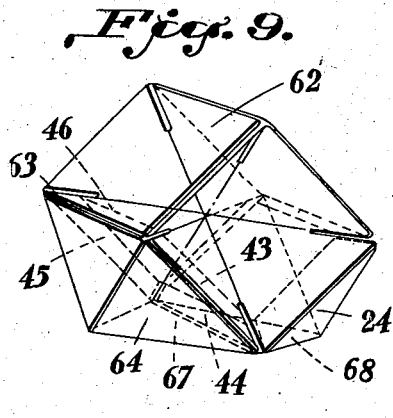
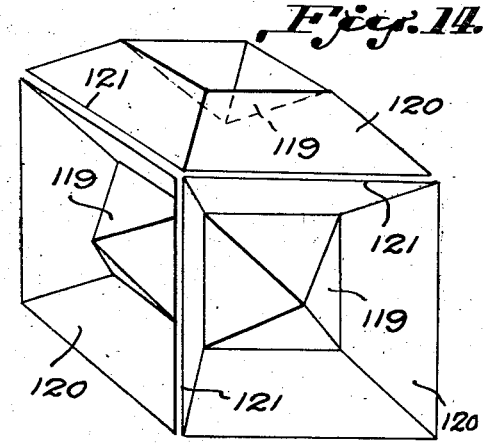
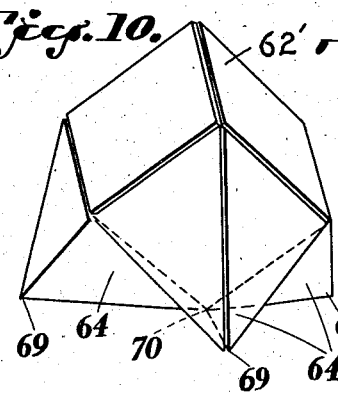
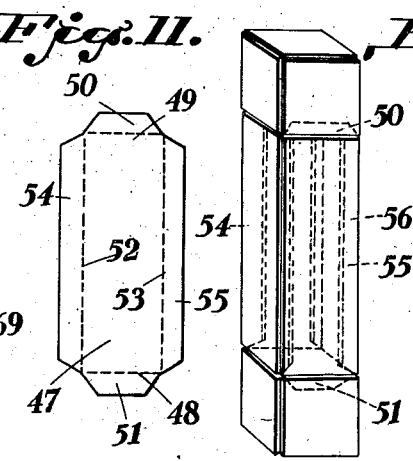
INVENTOR
Robert H. Anderson
ATTORNEYS Patented Mar. 21, 1939

2,151,066

UNITED STATES PATENT OFFICE 2,151,066

ARTICLE FOR STRUCTURAL AND OTHER PURPOSES

Robert Hutchison Anderson, Clifton, Bristol, England

Application July 1, 1936, Serial No. 88,452
In Great Britain October 19, 1935

18 Claims. (Cl. 35—72)

This invention relates to articles for structural and other purposes and has for its chief object to provide an article that may readily be joined to and separated from another such article so that structures, particularly models, may quickly and conveniently be assembled and disassembled for demonstration purposes, for instance for demonstrating mathematical theories.

The invention may also be applied to general structural purposes and to the provision of a new type of container for merchandise.

According to one feature of the invention an article for structural purposes comprises a plurality of elements that are juxtaposed and interconnected so as to leave a network or honeycomb of slots of plane form therebetween, said slots opening along lines that correspond to edges of a polyhedron.

According to another feature of the invention an article for structural purposes comprises a plurality of pyramids with the slant faces of the different pyramids arranged adjacent to one another and at an interior position relative to the completed article, said pyramids being connected interiorly to hold them together and thus provide slots extending from the edges of the article to said connection that may be used for the insertion of connecting pieces.

According to a further feature of the invention an article for structural purposes comprises a plurality of elements of pyramidal and wedge shapes, said elements being connected interiorly to hold them together thus providing slots extending from the edges of the article to said connections that may be used for the insertion of connecting pieces.

In another form the invention consists in an article for structural purposes comprising six equal square based pyramids whose heights are substantially equal to half the length of the base side, said pyramids being connected together at or near their apices to form a cube with slots between adjacent pyramids that may be used for the insertion of connecting pieces.

The invention also consists in the further features hereinafter described and claimed.

Preferably the elements are so constructed that their heights are slightly less than the distance from the surface of the article to the positions where they are connected. This results in the elements being strained to make said connection and hence adjacent faces are pressed tightly together so that connecting pieces may be tightly held therebetween.

Some of the elements may be made hollow and if desired the face opposite the apex omitted. Such an article may be adapted for use also as a container by providing lids to cover in the open faces of the hollow elements.

Various forms of structural articles in accordance with the present invention are diagrammatically indicated in the accompanying drawings in which:

Figs. 1–5 show a cube made from thin cardboard or the like, Fig. 1 being the blank from which the pyramids are constructed, Fig. 2 a plan view of a completed pyramid made from the blank shown in Fig. 1, Fig. 3 an elevation of the pyramid shown in Fig. 2, Fig. 4 a perspective view showing the relative positions of the pyramids before assembly into the completed article and Fig. 5 a finished cube showing extension flanges pulled out as connecting pieces.

Figs. 6–8 show a cube made from cardboard, or the like, but from a type of blank which results in a skeleton type of cube, Fig. 6 being a suitable blank from which the pyramids are constructed, Fig. 7 a perspective view indicating the relative positions of the separate pyramids before assembly into the completed article, and Fig. 8 a finished cube with an additional part that may constitute a closing face and/or connecting pieces for the cube.

Fig. 9 shows a modification to enable a cube to rest on one of its edges.

Fig. 10 shows a further modification to enable a cube to stand on one of its corners.

Fig. 11 shows a form of connecting strip for constructing columns.

Fig. 12 shows a column made by using the connecting strip of Fig. 11.

Fig. 13 shows a skeleton cube in which the pyramids have been truncated by inverting the apex.

Fig. 14 shows a modification to enable skeleton cubes to be placed securely on each other.

Referring to Figs. 1–5, the blank 1 for a pyramid comprises a square 2 equal in area to the base of a completed pyramid and provided with equal wings 3, 4 on opposite sides 5, 6 and equal extensions 7, 8 on the other two sides 9, 10.

The wings 3, 4 and the extensions 7, 8 are all in the form of trapezia that are symmetrical about a line joining the mid points of their parallel sides, but the sides 5, 6 of the square form the shorter of the two parallel sides of the wings 3, 4, while the sides 9, 10 of the square form the longer of the two parallel sides of the extensions 7, 8.

The wing 3 is creased or scored by lines 11, 12 which extend from the two corners of the square to the middle point of the longer parallel side of the wing, and thus said wing is divided by the scores into three triangles 13, 14, 15.

The wing 4 is similarly creased by lines 16, 17 to form triangles 18, 19, 20.

The operation of folding the blank 1 to form a pyramid is as follows:

The wings 3, 4 are folded about the sides 5, 6 respectively so that they meet at a line which is parallel to the line joining the middle points of the sides 9, 10 of the square but lies above the surface of said square.

The distance between the parallel sides of the wings 3, 4 is so selected that the height of the meeting line 21 above the surface of the square 2 is almost equal to half the side of the square and this is the required height of the finished pyramid. The triangle 13 is next folded about the line 11 until the edge 22 touches the square along the side 9, the arrangement being such that when this triangle has been so folded it will occupy the position where it acts as part of a side of the finished pyramid. The triangle 18, whose size is similarly selected, is next folded about the line 16 until its edge 72 almost touches the side 9 of the square when it will overlap the triangle 13.

The triangles 15 and 20 are then folded in similar manner but in opposite order. Thus the triangle 18 is folded over the triangle 13 and the triangle 20 is folded under the triangle 15. This forms an interlock as will be seen at 75 in Fig. 2 which prevents any tendency for the two wings 3, 4 to bend beyond their meeting line 21. Finally the extensions 7, 8 are folded about the sides 9, 10 so as to lie against the combined triangles 18, 13 and 15, 20 respectively and these are consequently prevented from spreading outwardly.

It will thus be seen as shown in Figs. 2 and 3 that a pyramid has been constructed whose base is the square 2 and slant surfaces are as follows: 1st surface is triangle 14, 2nd surface is triangles 13 and 18 and extension 7, 3rd surface is triangle 19 and 4th surface is triangles 20 and 15 and extension 8, and as hereinbefore described the height 23 of the pyramid is slightly less than half the length of the base side.

In constructing a cube, six of the above pyramids 24 are arranged as indicated in Fig. 4, so that the plain faces 14, 19 of one will contact with the overlapping faces 13, 18, 7 and 20, 15, 8 of others. Glue is then applied at or near the apices as indicated by 25 and the six pyramids are pressed in towards their apices and held firmly together until the glue has dried.

It will be observed that the plain faces 14, 19 of one cube will bind together the overlapping triangles 13, 18 and 20, 15 of others and so secure the six pyramids individually as well as collectively when the glue has dried.

With a cube as constructed above, it will be seen that a network or honeycomb of slots is formed opening along lines that correspond to all the edges of the cube and extending therefrom towards the centre of the polyhedron.

Pyramids formed as described with regard to Figs. 1–5 have the advantage that very little waste is occasioned by cutting the blanks from rectangular pieces of sheet material as the width of the wings 3, 4 is equal to the width of the square plus the extensions 7, 8.

Figs. 6–8 show a cube made from pyramids without bases which results in a skeleton cube as previously explained.

In this case the blank 29 for each pyramid is as shown in Fig. 6, and consists in the four sides of the pyramid opened out in the form of triangles 30, 31, 32, 33'. Scores or creases are made along the radial lines 26, 27, 28 and then the triangles 30, 31, 32 are folded in the same direction, each through an angle of about 60°, about the scores 26, 27, 28 respectively until the edges 33, 34 meet.

Such pyramids, as indicated in Fig. 7, are formed into a cube in the same way as previously described and the open edges 33, 34 of the different pyramids are arranged so that they come adjacent closed edges 26, 27, 28.

Preferably in this type of cube incisions 35 extend for a short distance up each edge of the pyramids in order to permit of the faces opening out more readily to receive connecting pieces.

Fig. 13 shows a form of cube made from pyramids with reentrant apices.

This cube 114 is made in the same manner as that described with reference to Figs. 6–8, but as will be seen, the slant faces of each of the pyramids are scored at 115, 116, 117, 118 (shown for one pyramid only) so that by folding the slant faces along said scores, the apex portions 119 are inverted and reenter the pyramids. Glue is applied just below the scores to connect the pyramids together.

In using the invention for toys and containers many other varieties of connecting pieces may also be employed. For instance columns for toys may be made by using connecting strips as shown in Fig. 11. This comprises a rectangle 47 bounded on its short sides 48, 49 by connecting extensions 50, 51 and on its longer sides by strengthening pieces 54, 55. To construct a column the connecting extensions 50, 51 of four such strips are inserted into similar slots in two cubes, the strengthening pieces 54, 55 being bent across between the two cubes through an angle of about 135° and thus, as will be seen in Fig. 12, a column is provided with cubes at each end and an intermediate tubular portion which is also provided with slots 56 at its edges but said slots 56 extend right through the tube. If desired the tubular portion may be made from a single folded sheet thus leaving one open edge.

A tubular portion as last described may also be applied when constructing a container for merchandise by attaching it to a cube at each end. In this case it would be desirable to have the folded connecting tubular portion permanently attached to the end cubes along three edges so as to leave one face free to open by turning about a folded edge. If the connecting tongues or extensions are glued on the inside only then the slots in which they are thereby cemented will not be sealed but will remain open for the insertion of further connecting strips.

Referring to Fig. 5, it will be seen that if one extension such as 7 is pulled out (this may easily be forced out with a piece of wire) it may be used in place of a separate connecting piece, and if two or more are pulled out one cube may be fixed face to face with another. With the arrangement of the pyramids shown in Fig. 4 there will be twelve connecting pieces available, one at each edge of the cube.

If it is desired to provide connecting pieces at the edges of a skeleton type of cube (Figs. 6–8) it may conveniently be accomplished by forming such pieces 38, 39, 40, 41 as extensions on the edge of a square 36, as shown in Fig. 8, the square 36 approximating to the area of the open face of the cube. This square 36 may be attached to the cube by two opposite pieces 39, 41, leaving two pieces 38, 40 free to be bent to connect with the edges of other cubes. It will be seen that if six squares 36 are attached to a cube in this manner there will be twelve extensions used to attach the squares and twelve available to use as connecting pieces and these may be arranged one at each edge of the cube.

In a modification of the last described feature, if all the extensions 38, 39, 40, 41 of six squares 36 are inserted in the appropriate slots of one cube so that the squares 36 form faces to the cube, it will be seen that a multiple container is formed comprising six compartments 73, each of said compartments being supplied with a lid 36. It will also be seen that slots 63 are still available for the insertion of connecting pieces. This feature is also useful when constructing models for demonstration purposes when such models are top heavy. In this case balance weights may be placed in compartments 73 of certain cubes to enable a model to stand upright.

Referring to Figs. 13 and 14, the above described feature of attaching lids to faces of skeleton type cubes is also useful when said cubes are partly or wholly constructed from truncated pyramids as previously described. In this case if a lid in the form of a truncated pyramid 120 is attached within the slots 121 of another cube (see Fig. 14), another similar cube as shown in Fig. 20 may be placed thereon and will be interlocked by reason of the external reentrant pyramid of the one fitting within the internal reentrant pyramid of the other.

Fig. 9 shows in perspective a cube standing on one of its edges. In this case a skeleton type cube 62 is shown with slots 63 along all edges of the cube, and two pyramids 64 attached. These pyramids are of the same form as those used for sheet metal cubes, i. e. made from the blank shown in Fig. 6 but with flanges 43, 44, 45, 46, said flanges being inserted in the slots 63.

The pyramids 64 will be of the same altitude as the ones forming the cube so that the faces 67, 68 lie in the same plane. It will thus be seen that the cube 62 is standing on an edge.

Fig. 10 shows the arrangement necessary for making a cube stand on one corner. In this case the cube 62' has three pyramids 64 attached in the same way as for Fig. 11. The pyramids in this case must be of greater altitude than those forming the cube so that the apices 69 and the corner 70 of the cube all lie in one plane.

Although the invention has been described as applied to rectangular polyhedra, it will be understood that any other shaped polyhedron may also be formed.

It will be understood that elements for constructing articles in accordance with the invention may be constructed from blanks other than those described. It will also be understood that the edges of the elements may be rounded or bevelled to enlarge the openings into the article without departing from the ambit of the invention.

What is claimed is:

1. An article for structural purposes comprising a plurality of elements of pyramidal form with the slant faces of the different pyramids arranged adjacent to one another and at an interior position relative to the completed article, said pyramids being connected near their apices to hold them together and thus leave exposed the outer edges of open joints of plane form provided between the unconnected portions of the adjacent slant faces of the pyramids which extend from the edges of the article to the said connections, and the exposed outer junction edges of said elements on the perimeter of said structural article outlining the form of a polyhedron.

2. An article for structural purposes comprising a plurality of elements of pyramidal and wedge shapes, said elements being connected interiorly to hold them together and thus leave exposed the outer edges of open joints of plane form provided between the unconnected portions of adjacent faces of the elements extending from the outer edges of said faces to the said connections, and the exposed outer junction edges of said elements on the perimeter of said structural article outlining the form of a polyhedron.

3. An article for structural purposes as claimed in claim 2 in which the elements are hollow and have no face opposite the apex.

4. An article for structural purposes comprising a plurality of pyramidal elements of yieldable sheet material, said elements arranged to be connected at their apical portions and the outer ends of said elements being free so as to leave exposed the outer edges of open joints of plane form provided between the adjacent unconnected portions of the slant faces of the elements, and in which the exposed outer junction edges of said elements on the perimeter of said structural article outline the form of a polyhedron.

5. An article for structural purposes as claimed in claim 4 in which the elements have no face opposite the apex.

6. An article for structural purposes comprising a plurality of pyramidal shaped hollow elements formed from flexible material, said elements arranged to be connected together at their apical portions and each having an opened face opposite its apex, the unconnected ends of the elements being free to provide open joints of plane form between the unconnected portions of the adjacent slant faces of the pymarids, and lids for closing the hollow elements.

7. An article for structural purposes comprising a plurality of pyramidal shaped hollow elements formed from flexible material, said elements arranged to be connected together at their apical portions and each having an opened face opposite its apex, the unconnected ends of the elements being free and thus leave exposed the outer edges of open joints of plane form provided between the unconnected portions of the adjacent slant faces of the pyramids, and lids for closing the open ends of the hollow elements, said lids being provided with connecting attachments of plane form to pack into the exposed open joints of plane form provided around the free end of each open element and thus secure said lids to close the open ends of the elements.

8. An article for structural purposes as claimed in claim 7 in which the connecting attachments of plane form on the lids are flexible so that some of said connections on a lid may secure it to close the open end of a hollow element of one article and in the same manner the remaining connections may secure it to close the open end of an element of another article and at the same time couple the two structural articles together.

9. An article for structural purposes comprising a plurality of pyramidal shaped elements formed from flexible material, each pyramid having its height equal to substantially half the length of its base, said elements arranged to be connected together at their apical portions to provide a substantially rigid article, and the outer ends of the elements being free so as to leave exposed the outer edges of open joints of plane form provided between the unconnected portions of adjacent slant faces of the elements extending from the outer edges of said faces to said connections, and the exposed outer junction edges of said elements on the perimeter of said structural article outlining the form of a polyhedron.

10. An article for structural purposes comprising a plurality of pyramidal shaped elements formed from flexible material, said elements arranged to have their inner portions connected together to provide a substantially rigid structure and the outer ends of the elements being free so as to leave exposed the outer edges of open joints of plane form provided between the unconnected portions of adjacent slant faces of the elements extending from the outer edges of said faces to the said connections, the height of the elements being slightly less than the distance from the surface of the article to the positions where the elements are connected whereby the elements are slightly strained to cause the faces of adjacent elements to be pressed and wedged together.

11. An article for structural purposes as claimed in claim 7, in which the elements are truncated and interconnected near their truncated ends.

12. An article for structural purposes as claimed in claim 4, in which the elements have no face opposite the apex and in which the elements are truncated by inverting their apices so that the said apices re-enter the truncated elements.

13. An article for structural purposes comprising a plurality of flexible polyhedron shaped elements, some of which are of multifaced wedge shape, said elements being packed together and having interiorly disposed portions connected together so as to provide a substantially rigid article and leave exposed the outer edges of open joints of plane form provided between the unconnected portions of the juxtaposed faces of adjacent elements, and the exposed outer junction edges of said elements on the perimeter of said structural article outlining the form of a polyhedron.

14. An article for structural purposes comprising a plurality of polyhedron shaped elements, some of which are of multifaced wedge shape, said elements being packed together and having interiorly disposed portions connected together to provide a substantially rigid article and leave exposed the outer edges of open joints of plane form provided between the unconnected portions of the juxtaposed faces of adjacent elements, and the exposed outer junction edges of said elements on the perimeter of said structural article outlining the form of a polyhedron.

15. An article for structural purposes comprising a plurality of polyhedron shaped elements, some of which are of multifaced wedge shape, said elements being packed together and having interiorly disposed portions connected together, said interior connection being such as to provide a flexible connection and produce a substantially rigid article and leave exposed the outer edges of open joints of plane form provided between the unconnected portions of the juxtaposed faces of adjacent elements, and the exposed outer junction edges of said elements on the perimeter of said structural article outlining the form of a polyhedron.

16. A blank for producing a pyramidal element with an even number of slant faces, said element having a base face provided with extensions on all sides, said extensions on alternate sides consisting of a face attached to the base and adapted to fold inwardly until the apices of the said alternate faces meet, and said faces on their opposite sides and the remaining sides of the base face being provided with polygon extensions arranged to fold inwardly and overlap and interlock so as to form the remaining slant faces of the pyramid.

17. A blank for producing a pyramidal element with an even number of slant faces, said element having a base face provided with extensions on all sides, said extensions on alternate sides consisting of a face attached to the base and adapted to fold inwardly until the apices of the said alternate faces meet, said extensions on all sides of the base face having their outer edge parallel to their base edge, and said faces on their opposite sides and the remaining sides of the base face being provided with polygon extensions arranged to fold inwardly and overlap and interlock so as to form the remaining slant faces of the pyramid.

18. A blank for producing a pyramidal element as in claim 17 in which the outer parallel edges of the blank form opposite sides and a part of opposite sides which together combine to make a rectangle.

ROBERT HUTCHISON ANDERSON.